United States Patent [19]

MacDonald

[11] 3,797,636

[45] Mar. 19, 1974

[54] TURNTABLE STOPPING APPARATUS

[75] Inventor: Stuart G. MacDonald, Rochester, N.Y.

[73] Assignee: Eastman Kodak Company, Rochester, N.Y.

[22] Filed: Aug. 31, 1972

[21] Appl. No.: 285,412

[52] U.S. Cl. ........................ 198/210, 198/19, 198/25
[51] Int. Cl. ........................ B65g 29/00
[58] Field of Search .......... 198/210, 19, 25; 214/89; 74/813 C, 826

[56] References Cited

UNITED STATES PATENTS 3,446,134 5/1969 Brown et al. ........................ 95/89 R

*Primary Examiner*—Evon C. Blunk
*Assistant Examiner*—Joseph E. Valenza

[57] ABSTRACT

A turntable stopping apparatus is adapted for use with a turntable of the kind supported for rotation about a rotary axis and for translation along the same axis. The apparatus is provided with at least one engageable stop member connected to the turntable for synchronous movement therewith and with a catch member for engaging the stop member, as the turntable is rotated about the rotary axis, to stop the turntable in a certain position of rotation. The catch member is configured to release the stop member from engagement, on translation of the turntable along the rotary axis, for allowing further turntable rotation until the same or another stop member is engaged.

8 Claims, 8 Drawing Figures

TURNTABLE STOPPING APPARATUS

BACKGROUND OF THE INVENTION

1. Field of the Invention

The present invention relates to apparatus for stopping a turntable in a certain position of rotation and, more particularly, to a turntable stopping apparatus which is adapted for use with a turntable of the kind supported for rotation about a rotary axis and for movement along such axis.

2. Description of the Prior Art

Various apparatus have been devised for stopping a revolving platform, such as a turntable of a turret, in a certain position of rotation. One group of such apparatus is designed for use with a single motion turntable, i.e., a turntable supported only for rotation. Examples of this apparatus are disclosed in U.S. Pat. Nos. 2,380,378, 2,532,855, 2,541,016 and 3,605,601.

Another group of turntable stopping apparatus, perhaps less known than the first-mentioned group, has been designed for use with a compound motion turntable of the kind which is supported for rotation about a rotary axis and for translation along such axis. Examples of this apparatus are disclosed in U.S. Pat. Nos. 3,233,532, 3,446,134 and 3,494,273.

As witnessed by some of the U.S. patents cited hereinbefore, presently known turntable stopping apparatus adapted for use with compound motion turntables generally are each provided with at least one engageable stop member which is connected to a turntable for synchronous movement therewith and with a catch member which operates to engage the stop member to arrest the turntable in a certain position of rotation. The catch member engages the stop member in a manner preventing translation of the turntable along the rotary axis, as well as preventing turntable rotation along the same axis. Thereafter, to free the turntable for translation and for renewed rotation, the catch member must be disengaged from the stop member by a separate mechanism, such as a lever device, which is actuated to withdraw the catch member from the stop member.

SUMMARY OF THE INVENTION

It is a primary object of the present invention to provide a turntable stopping apparatus which is simplified in design and operation, as compared to the previously described example of a turntable stopping apparatus.

It is another object of the present invention to provide a turntable stopping apparatus which has fewer movable member than the previously described example of a turntable stopping apparatus.

It is a further object of the present invention to provide a turntable stopping apparatus in which the catch member does not have to be withdrawn from the stop member, as in the previously described examples of a turntable stopping apparatus, to allow translation of the turntable along the rotary axis.

In accordance with the present invention there is disclosed, in detail hereinafter, a turntable stopping apparatus adapted for use with a compound motion turntable of the kind supported for rotation about a rotary axis and for translation along the same axis. The apparatus is provided with at least one engageable stop member connected to the turntable for synchronous movement therewith and with a catch member for engaging the stop member, as the turntable is rotated, to stop the turntable in a certain position of rotation. The catch member although engaging the stop member to prevent turntable rotation does not restrain the stop member in a manner preventing turntable translation, as in the previously described example of the prior art. Moreover, the catch member is configured to release the stop member from engagement, on translation of the turntable, for allowing further turntable rotation until the same or another stop member is engaged.

In a preferred embodiment of the present invention, the catch member is supported for pivotal movement between an initial or starting position, in which a recess portion of the catch member is disposed for receiving and engaging the stop member as the turntable is rotated, and a turntable stopping position, in which the catch member is held fast to prevent further turntable rotation and such recess portion is disposed to release the stop member from engagement on translation of the turntable. Moreover, the catch member is arranged at the path of rotation of the stop member in a manner such that the stop member will pivotally move the catch member out of the initial position and into the turntable stopping position as the turntable is rotated.

BRIEF DESCRIPTION OF THE DRAWINGS

The above-mentioned and other features and objects of the present invention and the manner of obtaining them will become more apparent by reference to the following detailed description of a preferred embodiment of such invention taken in conjunction with the accompanying drawings, wherein.

DESCRIPTION OF THE PREFERRED EMBODIMENT

It may be well before proceeding further, to first consider an aperture card camera-processor in which a turntable is mounted for rotation about a rotary axis and for translation along the same axis and in which a turntable stopping apparatus is included according to a preferred embodiment of the present invention. Such aperture card camera-processor, as will be described, operates to expose, process and dry photo-sensitive film sections while the film sections are in the form of inserts mounted in the apertures or windows of aperture cards.

It is to be understood that although the description hereinafter is directed to the use of a turntable stopping apparatus in an aperture card camera-processor other modes of carrying out the present invention can be effected within the spirit and scope of the invention.

GENERAL DESCRIPTION OF AN APERTURE CARD CAMERA-PROCESSOR

Figure 1:
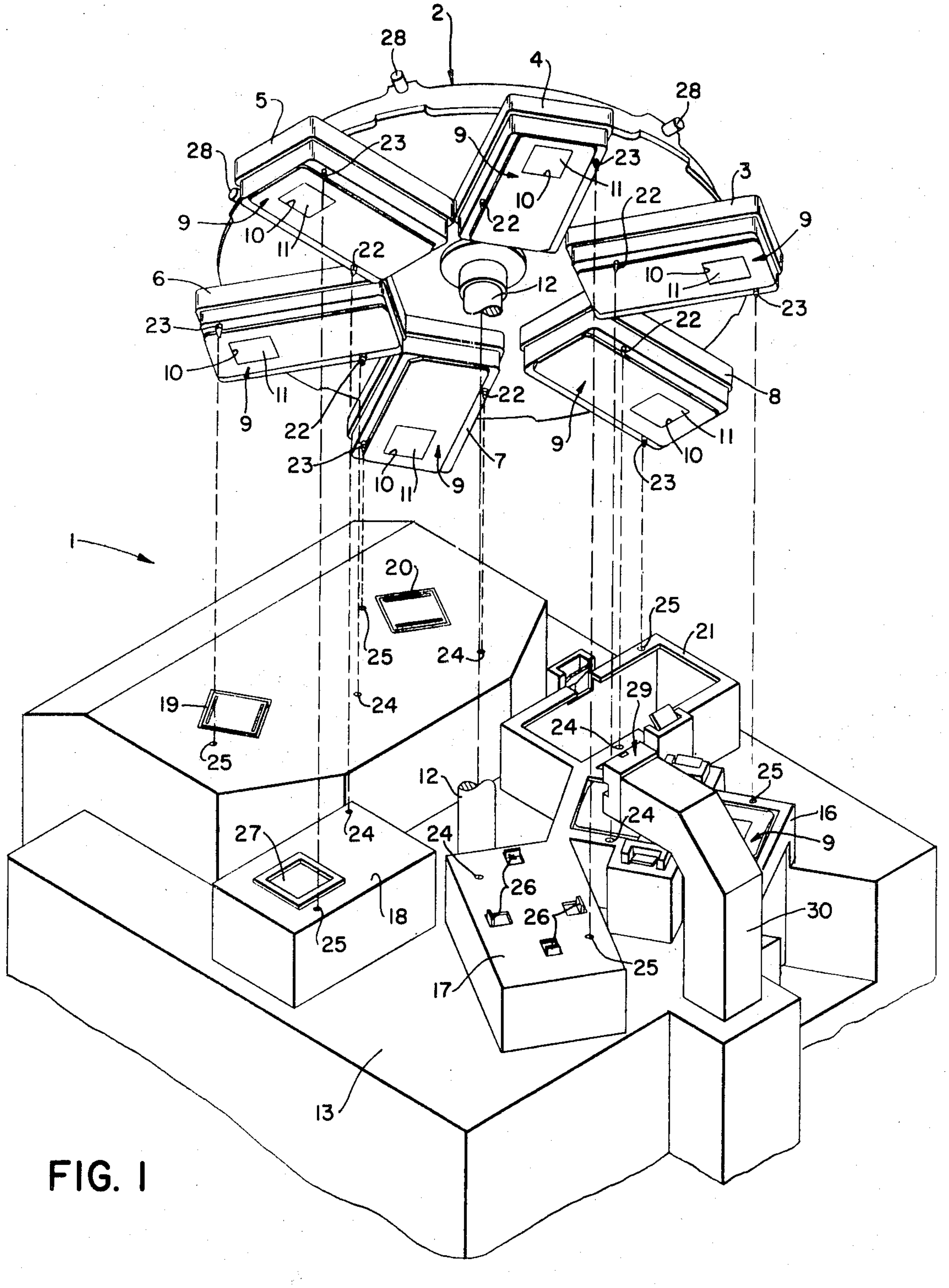
FIG. 1 is an exploded perspective view of an aperture card camera-processor in which is included a turntable and a turntable stopping apparatus according to a preferred embodiment of the present invention.

Referring now to the drawings and in particular to FIG. 1, there is shown an aperture card camera-processor generally indicated by the reference number 1 and in which a turntable or turret 2 is provided with six identical card holders 3, 4, 5, 6, 7 and 8 for respectively receiving six aperture cards 9 in the manner illustrated. As is well known, the aperture cards 9 are made of paper or cardboard stock and each have a window or aperture 10 in which a photo-sensitive film section 11 (usually 35mm in size) is mounted as an insert. The card holders 3–8 are arranged annularly at 60° intervals about a turntable center shaft 12 and include vacuum cups (not shown) or other suitable means for removably securing the aperture cards 9 to the card holders. The turntable 2 is fixed to the shaft 12 and the shaft, in turn, is journalled in a platform 13 and connected to an appropriate elevation mechanism 14 and an appropriate rotation mechanism 15 which are enclosed within the platform (see FIG. 3). The elevation mechanism 14 and the rotation mechanism 15 cooperate to rotate the turntable about a rotary axis, concentric with the shaft 12, and to translate the turntable in opposite directions along the same axis. More specifically, the rotation mechanism 15 serves to rotate the turntable 12 successively through 60° increments or steps, in a clockwise direction as viewed in FIG. 2, and at the completion of each such rotational increment the elevation mechanism 14 serves to first vertically lower the turntable a distance A, as viewed in FIG. 3, and to then vertically raise the turntable the same distance. As can be realized from FIG. 1, in the lowered position the turntable 2 locates the six card holders 3–8, and the six aperture cards 9 secured thereto, in respective registration with six work stations 16, 17, 18, 19, 20 and 21. The six work stations 16-21 are fixed to the platform 13 and arranged annularly at 60° intervals about the turntable center shaft 12, for effecting such registration with the six card holders 3–8 and the six aperture cards 9. To facilitate this registration, each of the card holders 3–8 is provided with two index pins 22 and 23 and each of the work stations 16–21 is provided with two wells 24 and 25, the index pins being received in the wells as the turntable 2 is lowered the distance A (see FIGS. 1 and 3). After a satisfactory time has elapsed to complete the operations at the respective work stations 16–21 the turntable 2 is first raised the distance A, removing the index pins 22 and 23 from the wells 24 and 25, and is then rotated a 60° increment. In this way, each of the six aperture cards 9 are conveyed by the turntable 2, in a step-by-step manner, successively through the six work stations 16–21.

The six work stations 16–21 cooperate to perform a series of six different operations on each of the six aperture cards 9. This series of operations is adapted to photograph individual documents (not shown) on the photo-sensitive film inserts 11 mounted in the aperture cards 9 and to rapidly process the film inserts to provide a photographic positive or negative image. The operation series begins at the work station 16 and is completed at the work station 21 (see FIG. 1). At the work station 16, which is a card loading station, a light-tight card container (not shown) is opened to enable the aperture cards 9 to be successively picked up by the card holders 3–8 as respective ones of the card holders are moved into registration with the card loading station (each time the turntable 2 completes a 60° rotational increment and is lowered the distance A). At the work station 17, which is a card aligning station, an aperture card is temporarily released from a card holder and exactly positioned relative to the index pins 22 and 23 on that card holder, by four movable tabs 26, in order to precisely located such card for film exposure at the next station 18. At the work station 18, which is a film exposing station, a photo-sensitive film insert mounted in an aperture card is exposed to light projecting through an optical mask 27 to photograph an image on the film insert. At the work station 19, which is a first film processing station, an exposed film insert is first treated by a developer solution and then by a stop solution. At the work station 20, which is a second film processing station, the exposed film insert, after previously being treated by the developer and stop solutions at the first processing station 19, is successively treated by a fix solution and a wash solution to finish processing of such film insert. Thereafter, at the work station 21, which is a film drying and discharging station, the processed film insert is first dried by heated air or other suitable means and is then fed into a card collection bin (not shown).

DETAILED DESCRIPTION OF A TURRET STOPPING APPARATUS

Figure 2:
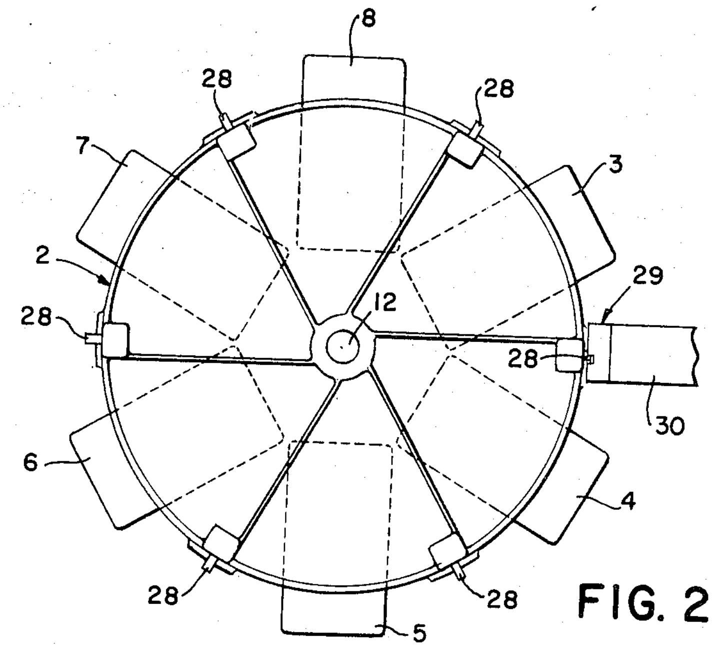
FIG. 2 is a top plan view of the turntable and the turntable stopping apparatus depicted in FIG. 1.
Figure 3:
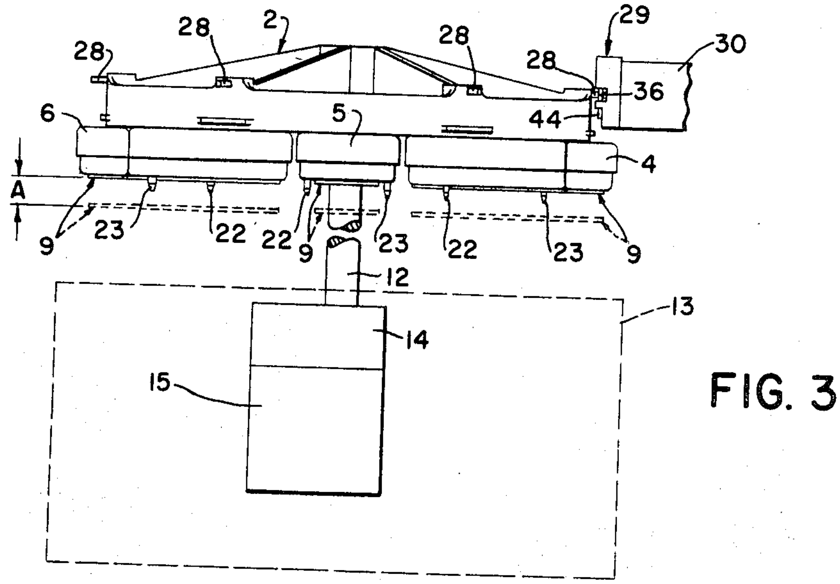
FIG. 3 is an elevation view of the turntable, the turntable stopping apparatus and a turntable drive mechanism which serves to rotate the turntable about a rotary axis and to translate the turntable along the same axis.

The turntable 2 is provided with six peripherally located stop members or stop pins 28 which are fixed to the turntable and extend in a substantially radial manner (see FIG. 2). Each of the six stop pins 28 is located approximately midway between adjacent ones of the six card holders 3–8 and can be moved into respective engagement with a turntable stopping mechanism 29, to arrest the turntable 2 in six different positions of rotation. As viewed in FIG. 1, the turntable stopping mechanism 29 is held above the platform 13 by an interconnecting bracket 30 and at an elevation enabling such engagement with the stop pins 28. Moreover, this mechanism 29 is oriented to engage a respective one of the six stop pins 28 and, thereby, stop rotation of the turntable 2 each time the turntable has been rotated by the drive motor 15 a 60° increment from one to another of the six work stations 16–21 (see FIGs. 1–3). When a stop pin 28 is engaged by the turntable stopping mechanism 29, the turntable 2 will be disposed to locate the six card holders 3–8, and the six aperture cards 9 secured thereto, in registration with the six work stations 16–21. Thus, when the elevation mechanism 14 lowers the turntable 2 the distance A (see FIGS. 1 and 3), the six aperture cards 9 will be deposited at the six work stations 16–21. After a satisfactory time has elapsed to complete the operations at the work stations 16–21, the turntable 2 is first raised the distance A by the elevation mechanism 14 and is then rotated by the rotation mechanism 15 a further 60° increment to advance another one of the stop pins 28 to the turntable stopping mechanism 29. Of course, when the other stop pin is engaged by the turntable stopping mechanism 29, to stop the turntable 2 in a new position of rotation, the elevation mechanism 14 again will lower the turntable the distance A to deposit the six aperture cards 9 at the six work stations 16–21; though, in this instance, the cards are placed at stations which differ from those formerly occupied. It will be appreciated that this sequence is repeated until each of the six aperture cards 9 is fed from the work station 21 into a collection bin (not shown).

Referring now to FIGS. 4–8, the turntable stopping mechanism 29 is shown in detail. This mechanism 29 includes a support base 31 in which is formed a T-shaped channel or guideway 32. The channel 32 has a first section 33 for receiving the stop pin as the turntable 2 completes rotation through a 60° increment (see FIGS. 6 and 7). A second channel section 34 receives the stop pin 28 as the turntable 2 is lowered the distance A (see FIGS. 7 and 8); the stop pin reversing direction in the second channel section as the turntable is raised the distance A (see FIG. 8). The channel 32 further has a third section 35 for receiving the stop pin 28 as the turntable 2 begins rotation through another 60° increment.

Figure 4:
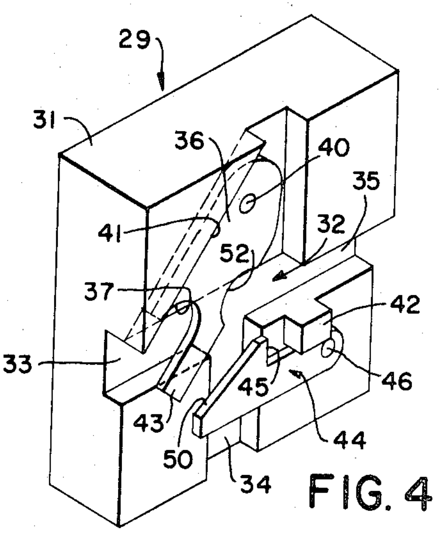
FIG. 4 is a perspective view of a catch member and a latch member of the turntable stopping apparatus.
Figure 6:
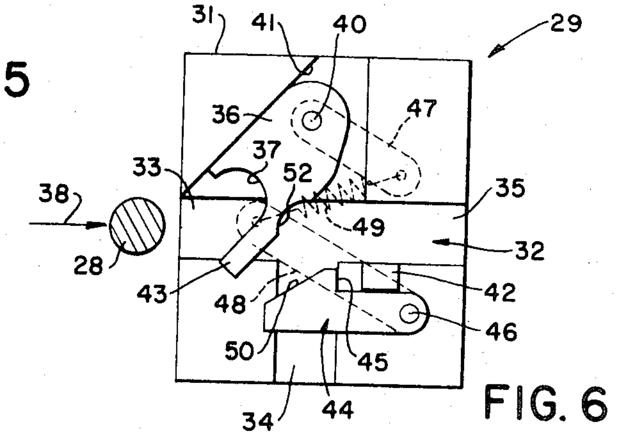
FIG. 6 is an elevation view of the catch member and the latch member in the same position relation as shown in FIG. 4, and an approaching stop pin which is fixed to the turntable.
Figure 7:
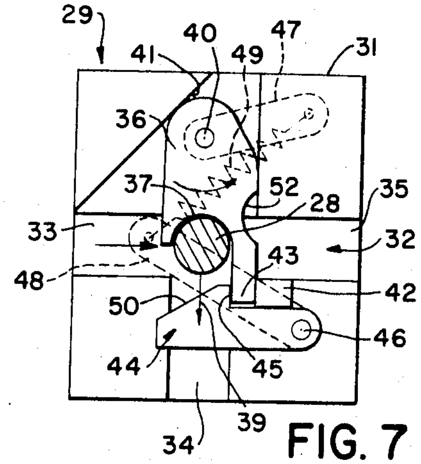
FIG. 7 is an elevation view similar to FIG. 6 showing the catch member engaging the stop pin to arrest the turntable in a certain position of rotation and, further, showing the latch member engaging the catch member to prevent reverse or counter rotation of the turntable.

A catch member 36 of the turntable stopping mechanism 29 has an arcuate recess portion 37 for receiving and engaging the stop pin 28, as the stop pin is moved within the first channel section 33 in a curvilinear direction generally indicated by the arrow 38 in FIGS. 6 and 7, and for releasing the stop pin from engagement, as the stop pin is moved along the second channel section 34 in a linear direction generally indicated by the arrow 39 in FIG. 7. Prior to arrival of the stop pin at the location shown in FIG. 7, the pin is prevented from movement in the linear direction by the first channel section. The catch member 36 is pivotally connected to the support base 31 by a coupling 40 for movement between an initial or starting position, wherein (as shown in FIGS. 4 and 6) the catch member is abutted against a raised edge portion 41 of the support base 31 and is disposed to receive the stop pin 28 at the recess portion 37, and a turntable stopping or arresting position, wherein (as shown in FIG. 7) the catch member engages the stop pin at the recess portion and is abutted against a blocking member 42 of the support base to stop the turntable 2 in a certain position of rotation, i.e., at the completion of a 60° rotational increment. In the turntable stopping position, the catch member 36 is disposed to release the stop pin 28 from engagement with the recess portion 37 because, as can be seen in FIG. 7, the recess portion opens into the second channel section 34. In other words, the catch member 36 in the turntable stopping position, although engaging the stop pin 28 to prevent turntable rotation, does not restrain the stop pin from being moved into the second channel section 34. Thus, the turntable 2 can be lowered the distance A (see FIGS. 3 and 8).

As shown in FIG. 6, the catch member 36 has an elongated free end portion 43 which is located substantially adjacent the recess portion 37 and extends across the path of movement of the stop pin 28 within the first channel section 33. Consequently the stop pin 28, moving along the first channel section 33 in the curlinear direction generally indicated by the arrow 38, will pivotally move the catch member out of the initial position shown in FIG. 6 and into the turntable stopping position shown in FIG. 7.

Figure 8:
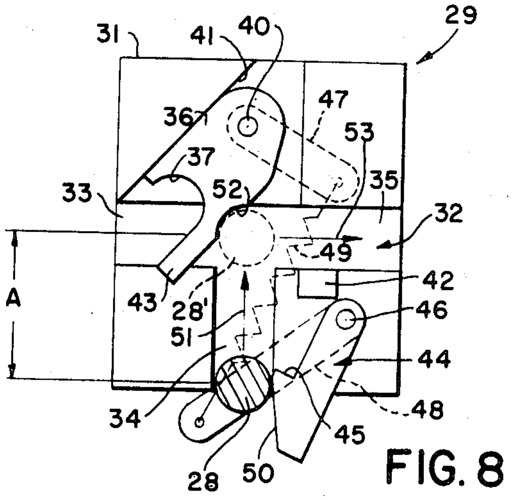
FIG. 8 is another elevation view showing the stop pin released from the catch member, and the catch member released from the latch member, on translation of the turntable along the rotary axis.

A latch member 44 of the turntable stopping mechanism 29 is engageable with the catch member 36, in the turntable stopping position, for preventing movement of the catch member out of the turntable stopping position as shown in FIG. 7. More specifically, the latch member 44 has a right-angled recess portion 45 which is adapted to engage the free end portion 43 of the catch member 36 in the manner shown by FIG. 7. Such manner of engagement serves to prevent reverse or counter rotation of the turntable 2 at the completion of each 60° rotational increment. The latch member 44 is pivotally connected to the support base 31 by a coupling 46 for movement between a latching position, wherein (as shown in FIGs. 6 and 7) the latch member is abutted against the blocking member 42 and is disposed for engaging the catch member 36, and an idle position, wherein (as shown in FIG. 8) the latch member is spaced from the blocking member to avoid engaging the catch member.

Figure 5:
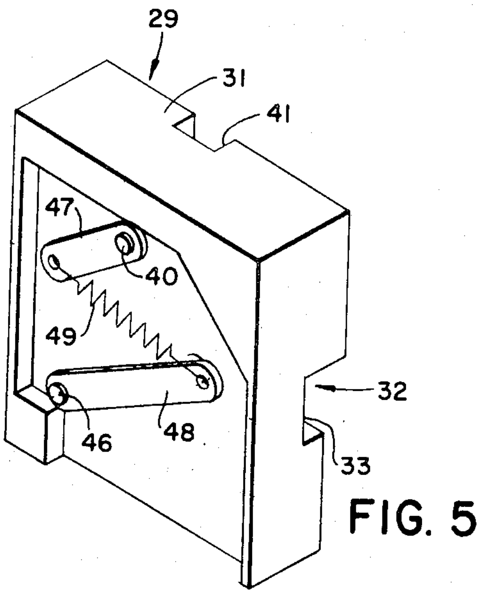
FIG. 5 is a perspective view of a spring linkage for urging the catch member and the latch member into the position relation shown in FIG. 4.

As can be seen in FIGS. 4 and 5, a first lever arm 47 is fixed to the catch member 36 via the coupling 40, whereby pivotal movement of the catch member results in a like movement of the first lever arm. A second lever arm 48 is fixed to the latch member 44 via the coupling 46, whereby pivotal movement of the latch member results in a like movement of the second lever arm. The first and second lever arms 47 and 48 are interconnected by a helical tension spring 49 which resiliently urges the catch member 36 out of the turntable stopping position and into the initial position and which, further, resiliently urges the latch member 44 out of the idle position and into the latching position.

The latch member 44 has a straight edge portion 50 which is arranged to extend across the path of movement of the stop pin 28 into the second channel section 34 (see FIG. 7). Thus, as the stop pin is first moved away from the recess portion 37 of the catch member 36 and along the second channel section 34, in the linear direction generally indicated by the arrow 39 in FIG. 7, the stop pin will pivotally move the latch member out of the latching position. At this time, since the catch member 36 is no longer engaged by the latch member 44, the spring 49 moves the catch member out of the turntable stopping position and into the initial position (see FIg. 8). After the stop pin 28 has moved the distance A along the second channel section 34, the latch member 44 will be restrained in the idle position by the stop pin (see FIG. 8). On reverse movement of the stop pin 28 along the second channel section 34, in a linear direction generally indicated by the arrow 51 in FIG. 8, the spring 49 pivotally moves the latch member 44 out of the idle position. After the stop pin 28 has returned the distance A along the second channel section 34, the stop pin will come to rest within a recessed edge portion 52 of the catch member 36 (as schematically illustrated by the stop pin 28′ in FIG. 8). At this time, the spring 49 will have pivotally moved the latch member 44 into abutment against the blocking member 42 of the support base 31. Thereafter, as the turntable 2 begins rotation through another 60° increment, the stop pin 28' will be moved along the third channel section 35 in a curvilienar direction generally indicated by the arrow 53 in FIG. 8. Of course, as the turntable 2 completes rotation through this 60° increment, a different one of the stop pins 28 will be received in the first channel section 34 and the foregoing sequence will be repeated.

It will be appreciated, on viewing FIGS. 6 and 7, that the catch member 36 and the latch member 44 are arranged with respect to each other to cause the free end portion 43 of the catch member to swing into abutment against the straight edge portion 50 of the latch member as the catch member is pivotally moved out of the idle position by the stop pin 28. Further pivotal movement of the catch member 36 by the stop pin 28 results in pivotal movement of the latch member 44 out of the latching position, so as to enable the free end portion 43 of the catch member to be moved against the blocking member 42 of the support base 31. Thereafter, the spring 49 will move the latch member 44 into the latching position to secure the catch member 36 in the turntable stopping position.

Accordingly, there has now been described a turntable stopping apparatus adapted for use with a compound motion turntable of the kind which is supported for rotational movement about a rotary axis and for reciprocating movement along the same axis. It will be appreciated, from this description, that the turntable stopping apparatus according to the present invention is simplified in design and operation as compared to the prior art apparatus previously discussed.

The present invention has been described in detail with particular reference to a preferred embodiment thereof, but it will be understood that variations and modifications can be effected within the spirit and scope of the invention.

I claim:

1. In combination with a turntable of the kind which is supported for rotation about a rotary axis and for translation along the same axis, a turntable stopping apparatus comprising:

a stop pin connected to said turntable for synchronous rotation and translation therewith;

a catch member having a recess portion for receiving and engaging said stop pin as said turntable is rotated in a given curvilinear direction about the rotary axis and for releasing said stop pin as said turntable is translated in a given linear direction along the rotary axis;

a support base;

a blocking member fixed to said support base and projecting therefrom;

means mounting said catch member on said support base for pivotal movement between an initial position, in which said catch member is spaced from said blocking member and disposed for receiving and engaging said stop pin at said recess portion, and a turntable stopping position, in which said catch member is abutted against said blocking member and disposed for releasing said stop pin from engagement with said recess portion;

said catch member mounting means including means for arranging said catch member to extend across the path of rotation of said stop pin in a manner such that said stop pin will pivotally move said catch member out of said initial position and into said turntable stopping position as said turntable is rotated in said given curvilinear direction;

means urging said catch member out of said turntable stopping position and into said initial position;

a latch member, engageable with said catch member in said turntable stopping position, for preventing movement of said catch member out of said turntable stopping position;

means mounting said latch member on said support base for pivotal movement between a latching position, in which said latch member is disposed substantially adjacent said blocking member for engaging said catch member, and an idle position, in which said latch member is spaced from said blocking member to avoid engagement with said catch member;

said latch member mounting means including means for arranging said latch member to extend across the path of translation of said stop pin in a manner such that said stop pin will pivotally move said latch member out of said latching position and into said idle position as said turntable is translated in said given linear direction; and means urging said latch member out of said idle position and into said latching position.

2. In combination with a turntable of the kind which is supported for rotation about a rotary axis and for movement along the same axis, a turntable stopping apparatus comprising:

an engageable stop member connected to said turntable for synchronous movement therewith;

a catch member including means for engaging said stop member as said turntable is rotated about the rotary axis and for releasing said stop member as said turntable is moved along the rotary axis;

a blocking member;

means supporting said catch member for movement between an initial position, in which said catch member is spaced from said blocking member and disposed for engaging said stop member, and a turntable stopping position, in which said catch member is abutted against said blocking member and disposed for releasing said stop member; and means defining a guide channel for receiving said stop member and, cooperating therewith, for preventing movement of said turntable along the rotary axis as said catch member is moved from said initial position toward said turntable stopping position.

3. A turntable stopping apparatus as recited in claim 2, wherein said catch member supporting means includes:

means for arranging said catch member at the path of rotation of said stop member in a manner such that said stop member will move said catch member out of said initial position and into said turntable stopping position as said turntable is rotated about the rotary axis.

4. A turntable stopping apparatus as recited in claim 3, further comprising:

means urging said catch member out of said turntable stopping position and into said initial position.

5. In combination with a turntable of the kind which is supported for rotation about a rotary axis and for translation along the same axis, a turntable stopping apparatus comprising:

a stop pin connected to said turntable for synchronous movement therewith;

a catch member having a recess portion which is configured for removably receiving said stop pin;

a support base;

a blocking member fixed to said support base and projecting therefrom;

means mounting said catch member on said support base for pivotal movement between an initial position, in which said catch member is spaced from said blocking member and is disposed for receiving said stop pin within said recess portion as said turntable is rotated in a given curvilinear direction about the rotary axis, and a turntable stopping position, in which said catch member is abutted against said blocking member and is disposed for removal of said stop pin from said recess portion on translation of said turntable in a given linear direction along the rotary axis;

said catch member mounting means including means for arranging said catch member at the path of rotation of said stop pin in a manner such that said stop pin will pivotally move said catch member out of said initial position and into said turntable stopping position as said turntable is rotated in said given curvilinear direction; and means urging said catch member out of said turntable stopping position and into said initial position.

6. A turntable stopping apparatus as recited in claim 5, wherein said catch member further has:

an elongate free end portion which is located substantially adjacent said recess portion and extends across the path of rotation of said stop pin, for enabling said stop pin to pivotally move said catch member out of said initial position and into said turntable stopping position as the turntable is rotated in said given curvilinear direction.

7. In combination with a turntable of the kind which is supported for rotation about a rotary axis and for translation along the same axis, a turntable stopping apparatus comprising:

an engageable stop member connected to said turntable for synchronous rotation and translation therewith;

a catch member including means for engaging said stop member as said turntable is rotated in a given curvilinear direction about the rotary axis and for releasing said stop member as said turntable is translated in a given linear direction along the rotary axis;

a support base;

a blocking member fixed to said support base and projecting therefrom;

means mounting said catch member on said support base for movement between an initial position, in which said catch member is spaced from said blocking member and disposed for engaging said stop member, and a turntable stopping position, in which said catch member is abutted against said blocking member and disposed for releasing said stop member;

said catch member mounting means including means for arranging said catch member at the path of rotation of said stop member in a manner such that said stop member will move said catch member out of said initial position and into said turntable stopping position as said turntable is rotated in said given curvilinear direction;

means urging said catch member out of said turntable stopping position and into said initial position;

a latch member, engageable with said catch member in said turntable stopping position, for preventing movement of said catch member out of said turntable stopping position;

means mounting said latch member on said support base for movement between a latching position, in which said latch member is disposed for engaging said catch member, and an idle position, in which said latch member is not disposed for engaging said catch member;

said latch member mounting means including means for arranging said latch member at the path of translation of said stop member in a manner such that said stop member will move said latch member out of said latching position and into said idle position as said turntable is translated in said given linear direction; and means for urging said latch member out of said idle position and into said latching position.

8. A turntable stopping apparatus as recited in claim 7, wherein said catch member and said latch member include:

cooperative means for causing said catch member to move said latch member into said idle position as said stop member moves said catch member out of said initial position and into said turntable stopping position and for enabling said latch member to move into said latching position once said catch member has moved into said turntable stopping position.

* * * * *